United States Patent
Weishaar

(10) Patent No.: US 9,879,712 B2
(45) Date of Patent: Jan. 30, 2018

(54) INTEGRATED HOOK AND HANDLE

(71) Applicant: Kevin Weishaar, Bison, SD (US)

(72) Inventor: Kevin Weishaar, Bison, SD (US)

( * ) Notice: Subject to any disclaimer, the term of this patent is extended or adjusted under 35 U.S.C. 154(b) by 0 days.

(21) Appl. No.: 15/403,587

(22) Filed: Jan. 11, 2017

(65) Prior Publication Data

US 2017/0219004 A1    Aug. 3, 2017

Related U.S. Application Data

(60) Provisional application No. 62/388,400, filed on Jan. 28, 2016.

(51) Int. Cl.
*F16B 45/00* (2006.01)
*B60P 7/08* (2006.01)

(52) U.S. Cl.
CPC ............ *F16B 45/00* (2013.01); *B60P 7/0853* (2013.01)

(58) Field of Classification Search
CPC ................................ F16B 45/00; B60P 7/0853
See application file for complete search history.

(56) References Cited

U.S. PATENT DOCUMENTS

| | | | | |
|---|---|---|---|---|
| 584,133 A * | 6/1897 | McIntire | .................. | B60N 3/02 |
| | | | | 105/354 |
| 687,137 A * | 11/1901 | Druen | ...................... | B65G 7/12 |
| | | | | 294/26 |
| 1,484,495 A | 2/1924 | Hatherly | | |
| 1,685,145 A * | 9/1928 | Bartenbach | ............ | F16L 345/00 |
| | | | | 24/698.1 |
| 2,271,901 A * | 2/1942 | Smith | ....................... | B65G 7/12 |
| | | | | 220/737 |
| 2,353,850 A * | 7/1944 | Roberts | ..................... | B66C 1/36 |
| | | | | 294/26 |
| 2,488,312 A * | 11/1949 | Milligan | .................. | B65G 7/12 |
| | | | | 294/26 |
| 3,310,331 A * | 3/1967 | Michaud | .................. | B65G 7/12 |
| | | | | 294/26 |
| 3,385,625 A | 5/1968 | Heines | | |
| 3,823,430 A | 7/1974 | Welsh, II et al. | | |
| 3,936,088 A | 2/1976 | Williams | | |
| 4,023,844 A * | 5/1977 | Roberts | ................. | A01M 31/00 |
| | | | | 294/26 |
| 4,364,592 A | 12/1982 | Jackson | | |
| 5,421,781 A | 6/1995 | MacKellar | | |
| D373,072 S * | 8/1996 | Durante | ........................ | D8/367 |
| D421,221 S | 2/2000 | O'Kane | | |
| 6,026,607 A * | 2/2000 | Bukowski | .............. | A01K 91/04 |
| | | | | 289/17 |
| 6,254,050 B1 | 7/2001 | Albrecht et al. | | |
| 6,397,513 B1 * | 6/2002 | Reed | ...................... | A01K 97/18 |
| | | | | 224/251 |
| 6,422,623 B1 | 7/2002 | Thomas | | |
| D489,963 S * | 5/2004 | Mazooji | ......................... | D8/370 |
| 7,125,060 B2 | 10/2006 | Crutcher | | |
| D536,415 S | 2/2007 | Riley | | |

(Continued)

*Primary Examiner* — Robert Sandy
*Assistant Examiner* — David M Upchurch
(74) *Attorney, Agent, or Firm* — Gordon Rees Scully Mansukhani LLP; David R. Heckadon

(57) ABSTRACT

A cord hook and handle formed from a single one-piece elongated body, wherein one end is formed in the shape of an S-shaped hook and the other end is formed in the shape of a T-shaped handle, and wherein the S-shaped hook end extends perpendicular to the T-shaped handle end.

10 Claims, 5 Drawing Sheets

(56) References Cited

U.S. PATENT DOCUMENTS

| | | | | |
|---|---|---|---|---|
| 7,344,173 | B2* | 3/2008 | Gonzalez | A47J 45/10 294/144 |
| 7,503,140 | B2* | 3/2009 | Polzin | A01K 91/10 43/15 |
| D623,489 | S | 9/2010 | Powell et al. | |
| 7,896,414 | B1* | 3/2011 | Brigham | B65G 7/12 294/25 |
| D648,208 | S * | 11/2011 | Platt | D8/367 |
| D661,574 | S * | 6/2012 | Platt | D8/367 |
| D665,641 | S * | 8/2012 | Raleigh | D34/10 |
| 8,740,255 | B1* | 6/2014 | Harris | F16L 37/00 224/269 |
| D722,255 | S | 2/2015 | Daudelin | |
| D742,188 | S * | 11/2015 | Sandelin | D8/14 |
| 2008/0272269 | A1* | 11/2008 | Moraysky | A45F 5/02 248/692 |
| 2008/0296186 | A1 | 12/2008 | Daun et al. | |
| 2009/0017996 | A1 | 1/2009 | Chic | |
| 2013/0277524 | A1* | 10/2013 | Fathi | F16B 45/02 248/308 |

* cited by examiner

US 9,879,712 B2

INTEGRATED HOOK AND HANDLE

CROSS REFERENCE TO RELATED APPLICATIONS

The present application claims priority to U.S. Provisional Patent Application Ser. No. 62/388,400 filed Jan. 28, 2016, entitled Cord Handle, the entire disclosure of which is incorporated herein by reference in its entirety.

TECHNICAL FIELD

The present invention relates in general to hook handles for mounting on the ends of cords and straps and in particular for mounting to the ends of elastic cords.

BACKGROUND OF THE INVENTION

Every day, millions of people use cords and straps to secure loads. Elastic cords and even bungee cords are often used for such purposes. Elastic cords can be used, for example, as follows. A jacket may be attached to the back of a motorcycle by hooking the elastic cord on one side of the seat, running the cord over the jacket, and then affixing the cord to the other side of the seat. As can be appreciated, there are an infinite number of uses for such cords and elastic devices.

The standard elastic cord has a simple hook affixed to either end. Each hook may be affixed to just about anything: metal edges, parts of wooden boxes, or metal rods. Typically, the inside surface of a hook engages (i.e.: wraps partially around) an object such as the metal rod to which it is hooked onto. In these situations, it is often difficult to grasp onto and lift the hook off of the metal rod, since the inside surface of the hook directly engages with the edge of the outer circumference of the rod, making the hook itself very difficult to grasp onto.

It is also difficult to grasp onto a slender hook. This is especially problematic when a number of different items are loaded together using a variety of different hooks that are also positioned close together. Individual hooks in these situations are difficult to distinguish from one another and are also hard to grasp onto. Moreover, it is often difficult to apply much force when disconnecting the hook and pulling it away from the object to which it is attached.

The present system overcomes these disadvantages and provides an integrated hook and handle that solves the above problems and is much easier to grasp onto and apply force to. As such, the present invention provides a simple and efficient method of improving the functionality of elastic (or even bungee) cords. The present integrated hook and handle is easy to use and grasp onto in any situation. This makes it very safe to use. It is also simple, reliable inexpensive, and easy to operate and maintain. It also provides a secure gripping surface even in oily situations.

SUMMARY OF THE INVENTION

The present invention provides an integrated hook and handle, comprising: a one-piece continuous elongated body having a first portion and a second portion, wherein the first portion is formed in the shape of an S-shaped hook, and the second portion is formed in the shape of a T-shaped handle, and wherein the S-shaped hook portion extends perpendicular to the T-shaped handle portion. The first and second portions are preferably continuously formed from a single integral bar of material bend or otherwise formed into the present novel shape such that: (a) the S-shaped hook supports the end of an elastic cord, (b) the S-shaped hook provides a hook for securing the elastic cord; and that (c) the T-shaped handle provides a convenient handle for an operator to grasp onto, pull and thereby stretch the elastic cord.

In preferred embodiments, the height of the S-shaped hook is slightly smaller than the height of the T-shaped handle, and approximately the same as the width of the T-shaped handle.

Preferably, the free end of the S-shaped hook points downwardly and the T-shaped handle loops back upon itself such that entire hook and handle assembly is formed from a single continuous bent beam of material.

A free end of an elastic cord is looped over an inner curved portion of the S-shaped hook such that an operator can grab onto the T-shaped handle and thereby pull the free end of the bungee or elastic cord.

DETAILED DESCRIPTION OF THE DRAWINGS

Figure 1:
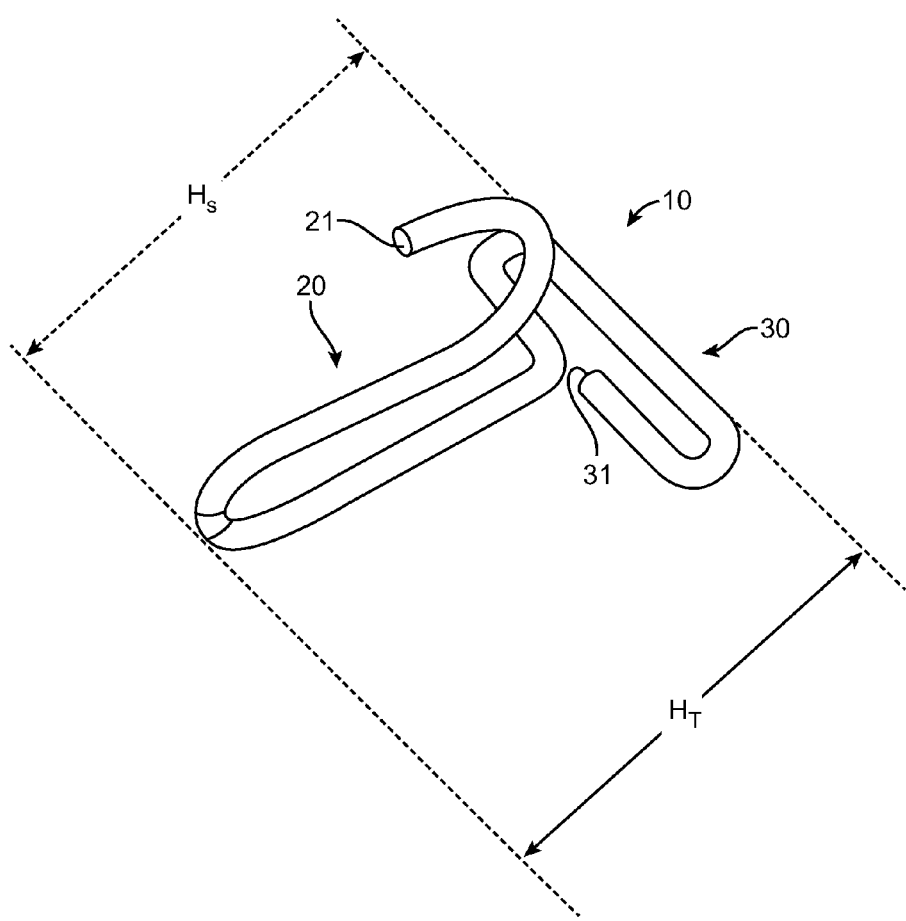
FIG. 1 is a perspective view of the present integrated hook and handle assembly.
Figure 2:
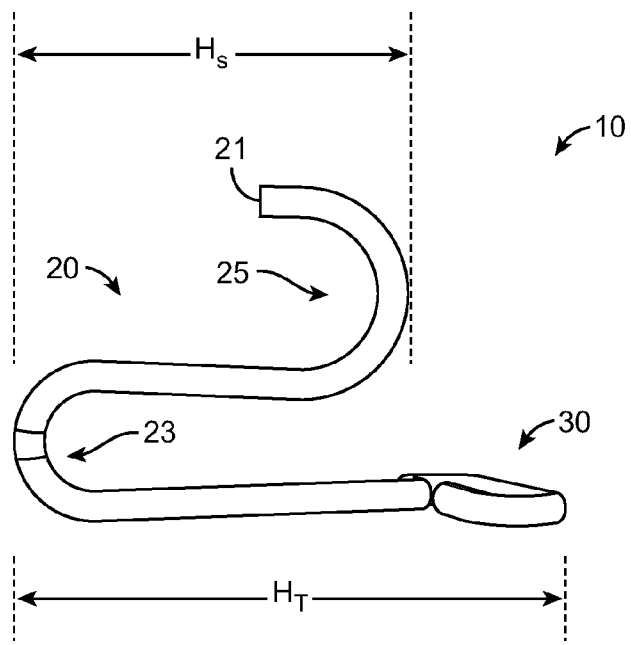
FIG. 2 is a side elevation view of the present integrated hook and handle assembly.
Figure 3:
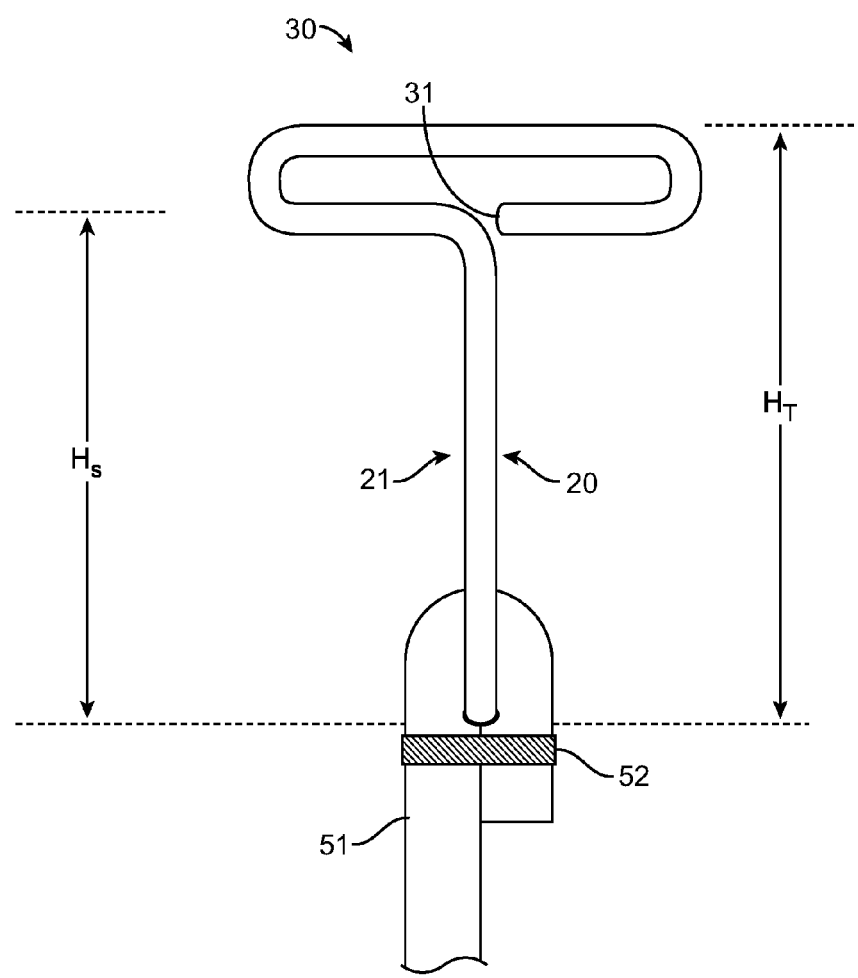
FIG. 3 is a front elevation view of the present integrated hook and handle assembly.

FIGS. 1, 2 and 3 show various views of the present integrated hook and handle assembly 10, as follows. Assembly 10 comprises a first portion 20 and a second portion 30. Portions 20 and 30 are preferably formed from a single one-piece continuous elongated body.

First portion 20 is formed in the shape of an S-shaped hook, and second portion 30 is formed in the shape of a T-shaped handle. As can be seen, the S-shaped hook portion 20 extends perpendicular to the T-shaped handle portion 30. (For example, as seen in FIG. 3, the S-shaped hook portion 20 extends perpendicular to the page whereas the T-shaped handle portion is disposed in the plane of the page). Portions 20 and 30 are preferably continuously formed from a single integral bar of material.

As can also be seen, the height $H_S$ of the S-shaped hook is just slightly smaller than the height $H_T$ of the T-shaped handle.

As can also be seen, the height $H_S$ of the S-shaped hook is approximately the same as the width $W_T$ of the T-shaped handle.

Additionally, a free end 21 of the S-shaped hook 20 points downwardly in a direction parallel to the bottom of the T-shaped handle.

As can also be seen, T-shaped handle portion 30 is preferably formed by the elongated body bending to loop back upon itself such that a free end 31 of the T-shaped handle points towards the center of the T-shaped handle as shown. In alternate embodiments, there is no free end 31 since this point is simply welded back onto the junction of the T-shaped handle.

As best seen in FIG. 2, S-shaped hook 20 has first and second curved portions 23 and 25. Optionally, curved portion 25 can have a larger radius of curvature than curved portion 23. However, curved portion 23 can instead have a larger radius of curvature than curved portion 25. In other embodiments, curved portions 23 and 25 have the same radius of curvature.

The end of elastic cord 50 is preferably connected onto assembly 10 with a free end 51 of elastic cord 50 being looped over curved portion 23 and secured in place with a clamp 52.

Assembly 10 can optionally be made of metal or any other suitable material.

Figure 4A:
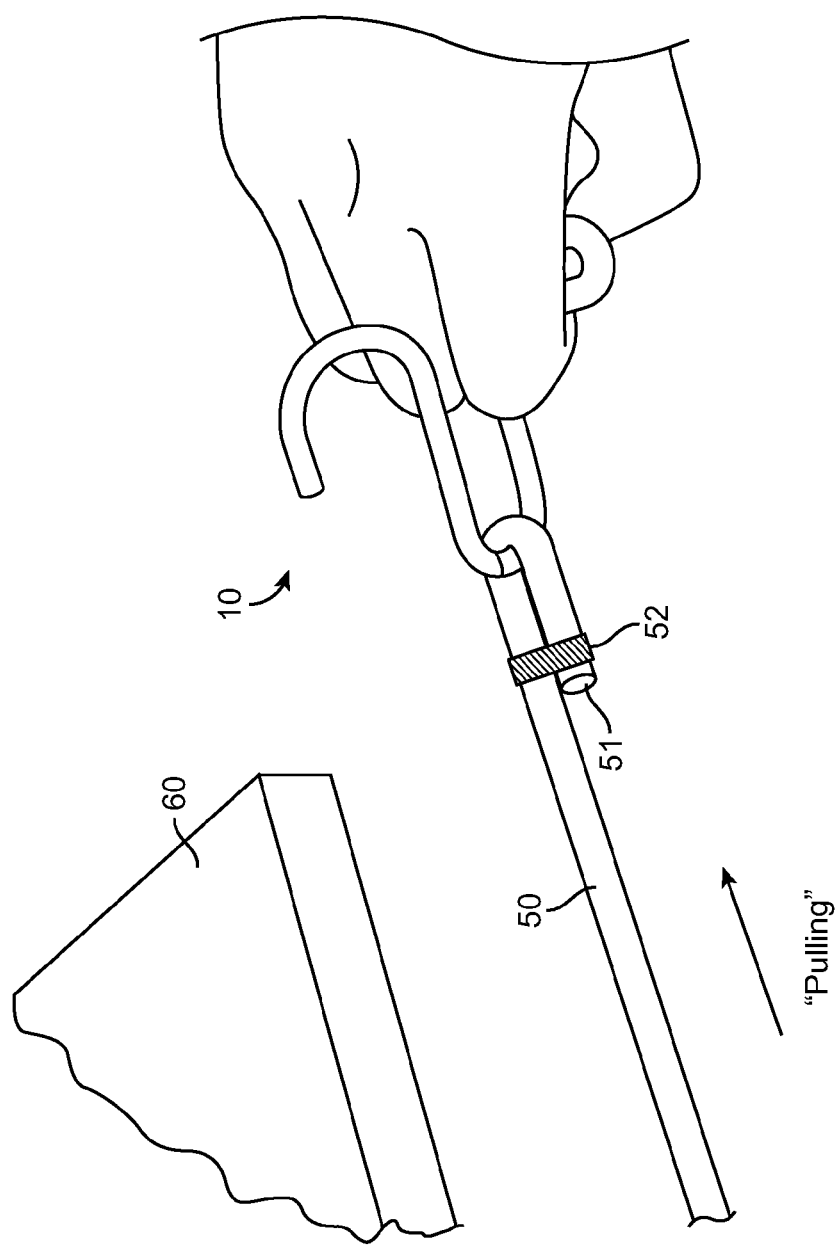
FIG. 4A is a first perspective view of an operator using the present integrated hook and handle assembly to hook an end of an elastic cord onto an object.
Figure 4B:
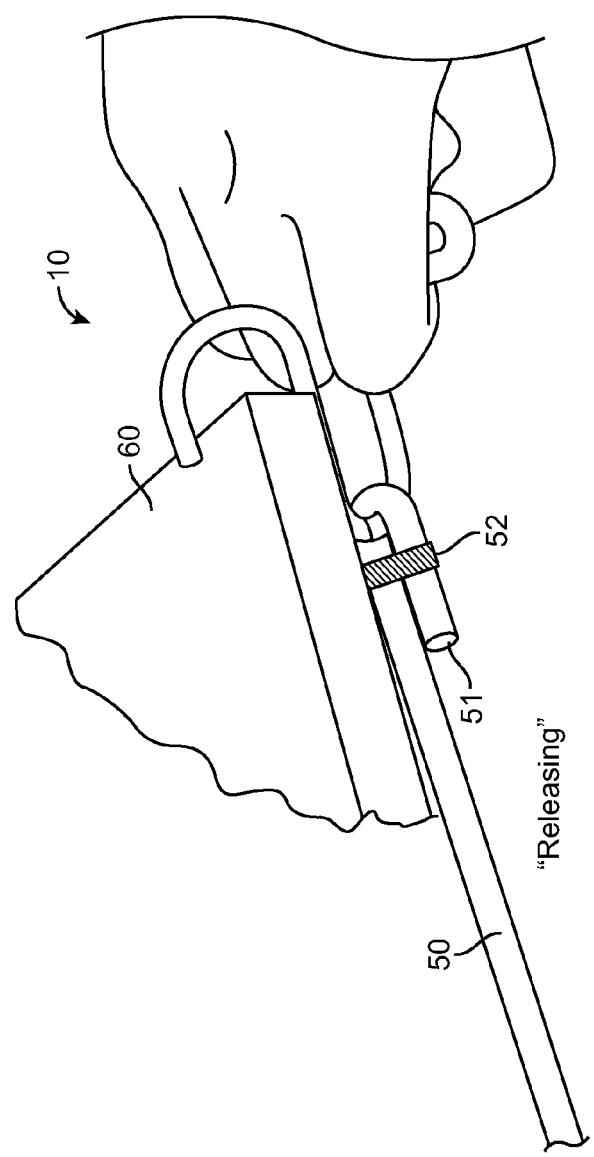
FIG. 4B is a second perspective view of the operator hooking the end of the elastic cord onto the object of FIG. 4A.

Finally, operation of the hook and handle assembly can be seen by viewing FIGS. 4A and 4B. In FIG. 4A, the cord 50 is in its normal (non-stretched) position. An operator grabs onto T-shaped handle 30 and pulls upwardly, stretching elastic cord 50. Next, as seen in FIG. 4B, the user pulls the handle such that the free end 21 of S-shaped hook 20 latches around object 60, thereby securing cord 50 to object 60, as shown.

What is claimed is:

1. An integrated hook and handle, comprising:
    a one-piece continuous elongated body having a first portion and a second portion, wherein
    the first portion is formed in the shape of an S-shaped hook in a first plane, and
    the second portion is formed in the shape of a T-shaped handle in a second plane, and wherein the S-shaped hook portion extends perpendicular to the T-shaped handle portion, and
    wherein the first plane is perpendicular to the second plane.

2. The integrated hook and handle of claim 1, wherein the first and second portions are continuously formed from a single integral bar of material.

3. The integrated hook and handle of claim 1, wherein the height of the S-shaped hook is slightly smaller than the height of the T-shaped handle.

4. The integrated hook and handle of claim 1, wherein the height of the S-shaped hook is approximately the same as the width of the T-shaped handle.

5. The integrated hook and handle of claim 1, wherein a free end of the S-shaped hook points downwardly in a direction parallel to the bottom of the T-shaped handle.

6. The integrated hook and handle of claim 1, wherein the T-shaped handle is formed by the second portion of the elongated body bending to loop back upon itself such that a free end of the T-shaped handle points towards the center of the T-shaped handle.

7. The integrated hook and handle of claim 1, wherein the S-shaped hook has first and second curved portions and wherein one curved portion has a larger radius of curvature than the other.

8. The integrated hook and handle of claim 7, wherein the curved portion closer to the T-shaped handle has a smaller radius of curvature than the curved portion at a free end of the S-shaped hook.

9. The integrated hook and handle of claim 8, further comprising:
    an elastic cord, wherein a free end of the elastic cord is looped over the curved portion of the S-shaped hook.

10. The integrated hook and handle of claim 1, wherein the handle is made of metal.

* * * * *